Patented Jan. 27, 1953

2,626,945

UNITED STATES PATENT OFFICE 2,626,945

INTERPOLYMERIZATION OF POLYOLEFINIC ESTERS OF 2-ALKENYL ALCOHOLS WITH CERTAIN MONOOLEFINIC HYDROCARBONS

Frank J. Carlin, Upper Saddle River, N. J., assignor to United States Rubber Company, New York, N. Y., a corporation of New Jersey No Drawing. Application July 11, 1949,
Serial No. 104,155

3 Claims. (Cl. 260—78.5)

This invention concerns the preparation of new soluble, unsaturated resins derived from polyolefinic esters which are capable of being converted to an insoluble and heat-resistant state by further polymerization induced by heat and/or catalysts. More particularly, the invention concerns new soluble, unsaturated interpolymers of (A) polyolefinic esters of 2-alkenyl alcohols and (B) certain monoolefinic hydrocarbons, and preferably including (C) a third copolymerizable monoolefinic compound.

This application is a continuation-in-part of my previous application, Serial No. 734,535, filed March 13, 1947.

It is known that polyolefinic esters such as allyl acrylate, diallyl oxalate and diallyl fumarate polymerize to form an insoluble, intractable gel before more than a minor amount of the monomer has been converted to the soluble polymeric form. Such products are useless for many industrial products, such as coating compositions, which require an initially soluble resin which, after application, can be subsequently cured to a solvent- and heat-resistant state. Hence, such polymerized polyolefinic ester reaction mixtures must be fractionated to remove the useless gel, after which the small amount of desired soluble polymer is separated and the large quantity of unreacted monomer is recovered, purified and recycled for use in subsequent polymerizations, thereby lessening to some degree the economic disadvantages of this process.

I have now discovered that the above-mentioned disadvantages can be overcome and the major proportion of the monomeric reactants converted to the soluble, unsaturated polymeric form without danger of the premature gelation heretofore encountered. My method comprises carrying out the polymerization of said polyolefinic ester "A" in the presence of a copolymerizable, monoolefinic aliphatic hydrocarbon "B" (in which category I include both acyclic and cyclic alkenes) having from 4 to 16 carbon atoms, preferably the liquid hydrocarbons having from 5 to 10 carbon atoms. Exemplary of such hydrocarbons are 1-pentene; 2,4,4-trimethyl-1-pentene, 2,4,4-trimethyl-2-pentene, and the commercial mixture of the last two compounds known as diisobutylene; 1-hexene, cyclohexene, 1-heptene, 1-octene, 2-octene, 1-nonene and 1-decene, those having a terminal ethylenic linkage being especially preferred.

I have found that the presence of as little as 0.2 mole of the olefin hydrocarbon "B" per mole of the polyolefinic ester "A" is sufficient to secure an increased conversion of the latter to the acetone-soluble, convertible polymeric form. This conversion to soluble polymer increases as the amount of the copolymerizable monoolefin present increases, and when from 4 to 8 moles of the latter are present, the major proportion of the monomeric polyolefinic ester present can be converted to the soluble polymeric form without danger of insolubilization.

Suitable polyolefinic esters include 2-alkenyl esters, particularly (a) the esters of 2-alkenyl alcohols having the general formula

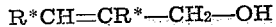
R*CH=CR*—CH$_2$—OH in which one R* is hydrogen and the other R* is one of the radicals hydrogen, chlorine, methyl, ethyl and phenyl, and (b) the esters of allyloxy-alkanols of the formula

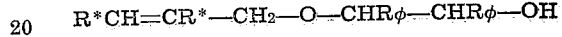
R*CH=CR*—CH$_2$—O—CHR$\phi$—CHR$\phi$—OH in which R* is as defined above, and R$\phi$ is hydrogen or alkyl (e. g., methyl, ethyl, propyl, butyl, amyl, hexyl, heptyl, octyl). Exemplary of such alcohols are allyl, methallyl, ethallyl, chloroallyl, crotyl, cinnamyl, beta-allyloxyethyl, beta-methallyloxyethyl and beta-allyloxypropyl alcohols of which those in which the terminal R* is hydrogen are preferred. The polyolefinic esters derived from the allyloxyalkanols are of particular interest to the surface-coating industry since such esters yield "air-drying" polymers in many cases.

Such olefinic alcohols can be esterified with olefinic monocarboxylic acids (i. e., alkenoic acids), with saturated polybasic acids, with olefinic polybasic acids, and with inorganic polybasic acids, to yield polyolefinic esters for use in my invention. Preferred alkenoic acids are the 2-alkenoic acids of the general formula

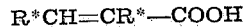
R*CH=CR*—COOH in which R* is as defined above. Exemplary of such acids are acrylic, methacrylic, ethacrylic, chloracrylic, crotonic, and cinnamic acids. The terminal R* is preferably hydrogen, as in the acrylic acids. Of the polybasic acids, the olefinic and in particular the alpha-olefinic acids are preferred by reason of the ready interpolymerizability of their alkenyl esters according to my invention as well as because of the high yields of soluble, convertible resins obtained therefrom and the desirable properties of the final cured products, including toughness, adhesion and flexibility. Such acids include fumaric, itaconic, maleic, citraconic, mesaconic and aconitic in the approximate order of decreasing preference based on the above criteria as well as on cost and availability. Exemplary of the saturated polycarboxylic acids are oxalic, malonic, alpha-methylmalonic, succinic, glutaric, adipic, pimelic, azelaic, and phthalic acids, of which the latter is especially preferred. In general, the 2-alkenyl esters of these acids tend to interpolymerize somewhat less rapidly than the others defined above, and the curing of the resulting resins often requires more stringent conditions. The interpolymerizability of such esters can be improved by the inclusion in the initial reaction mixture of a copolymerizable monoolefinic acid or a hydrolyzable derivative thereof, e. g., diethyl fumarate or methyl acrylate.

Exemplary of the polyalkenyl esters of inorganic polybasic acids are those of carbonic acid, sulfuric acid, and particularly those of tri- and tetra-basic acids, including phosphoric, silicic, stannic and titanic acids. These alkenyl esters yield, by my method, soluble, convertible interpolymers which are useful as baking enamels and for making non-flammable plastic objects capable of withstanding high temperatures. Like the polyalkenyl esters of the non-enic polycarboxylic acids, the polyalkenyl esters of the polybasic inorganic acids often interpolymerize more readily and yield more satisfactory resins when a third copolymerizable, monoolefinic compound such as an alkenoic acid or hydrolyzable derivative thereof is also present in the interpolymerization reactant mixture.

A representative list of the polyolefinic esters useful in my invention, as defined, includes allyl acrylate, allyl methacrylate, beta-allyloxyethyl acrylate, chloroallyl acrylate, allyl chloroacrylate, allyl ethacrylate, methallyl cinnamate, allyl crotonate, crotyl acrylate, diallyl fumarate, dimethallyl fumarate, di-beta-allyloxyethyl fumarate, di-beta-methallyloxyethyl fumarate, diallyl itaconate, di-beta-allyloxyethyl itaconate, dimethallyl maleate, diallyl citraconate, dimethallyl citraconate, triallyl aconitate, diallyl oxalate, diallyl succinate, dichloroallyl adipate, dicrotyl succinate, dimethallyl adipate, di-beta-allyloxyethyl adipate, diallyl phthalate, dimethallyl phthalate, di(chlorallyl)phthalate, di-beta-allyloxyethyl phthalate, diallyl carbonate, diallyl sulfate, triallyl phosphate, trimethallyl phosphate, tri-beta-allyloxyethyl phosphate, tetraallyl silicate, tetra-methallyl stannate, and tetraallyl titanate.

In the preferred form of the invention, the interpolymerization of the polyolefinic ester "A" with the olefinic hydrocarbon "B" is carried out in the presence of a third copolymerizable, monoolefinic compound "C" to secure high yields of soluble, convertible polymeric materials. In this manner, new interpolymers having improved physical properties, such as toughness, flexibility, initial compatibility with solvents, etc., can be obtained by interpolymerization with from about 0.1 to 8.0, particularly 0.5 to 6.0, molar equivalents of said third copolymerizable, monoolefinic compound or mixtures thereof.

Suitable third copolymerizable monoolefinic compounds "C" are those represented by the formula $RR'C=CR''R'''$ wherein R is selected from hydrogen, fluorine and methyl; R' is selected from hydrogen, fluorine, carboxyl, and groups hydrolyzable to carboxyl including carboalkoxy (e. g., carbomethoxy, carboethoxy, carbohexoxy), carboaryloxy (e. g., carbophenoxy, carbotolyloxy), carbaralkoxy (e. g., carbobenzyloxy), carbamyl, N-alkylcarbamyl (e. g., N-methylcarbamyl), N-arylcarbamyl (e. g., N-phenylcarbamyl), and carbonitrilo; R'' is selected from hydrogen, lower alkyl (e. g., methyl, ethyl), chlorine, fluorine, carboxyl, and groups hydrolyzable to carboxyl; R''' is selected from chlorine, fluorine, aryl (e. g., phenyl, tolyl and naphthyl), chloroaryl (e. g., p-chlorophenyl), pyridyl, carboxyl, groups hydrolyzable to carboxyl, alkoxy (e. g., methoxy, ethoxy, propoxy, isopropoxy, butoxy, amyloxy, hexoxy, heptoxy, octoxy, nonoxy, decoxy), aryloxy (e. g., phenoxy, tolyloxy, naphthoxy), chloroaryloxy (e. g., p-chlorophenoxy), p-methoxy-phenoxy, aralkoxy (e. g., benzyloxy), acyloxy in which the acyl group is devoid of olefinic and acetylenic unsaturation (e. g., acetoxy, propionoxy, butyroxy and benzoyloxy), acyl as previously defined (e. g., acetyl, propionyl, isobutyryl, benzoyl), provided that R''' may be carboxyl or a group hydrolyzable to carboxyl only when R' is carboxyl or a related group; and provided that R''' may together with R' comprise one of the radicals dicarbanhydro (—CO—O—CO—) and dicarboimido (—CO—NR$\phi$—CO—), where R$\phi$ is hydrogen, alkyl (e. g., methyl, ethyl, propyl, isopropyl, butyl, isobutyl, amyl, cyclopentyl, hexyl, cyclohexyl, heptyl, octyl, nonyl, decyl), aryl (e. g., phenyl, tolyl, xylyl, xenyl, naphthyl), or aralkyl (e. g., benzyl, phenethyl).

The following classes of the third copolymerizable, monoolefinic compound "C" are especially preferred:

(a) aryl-substituted vinyl compounds, e. g., styrene, p-methylstyrene, alpha-methylstyrene, alpha-vinylnaphthalene, and alpha-vinylpyridine;

(b) mono-vinyl ethers and esters, e. g., ethyl vinyl ether, propyl vinyl ether, isopropyl vinyl ether, butyl vinyl ether, phenyl vinyl ether, benzyl vinyl ether, vinyl acetate, vinyl propionate, vinyl butyrate, vinyl benzoate and vinyl chloride;

(c) alpha-alkenoic acids and derivatives hydrolyzable thereto, e. g., acrylic acid, methyl acrylate, methyl methacrylate, tolyl acrylate, benzyl acrylate, methyl chloroacrylate, methyl crotonate, acrylonitrile, methacrylonitrile, acrylamide, methacrylamide, diethyl fumarate, dimethyl maleate, di-2-ethylhexyl itaconate, maleimide and N-methylmaleimide.

In the practice of my invention, the polyolefinic ester is heated at temperatures of 25–150° C., preferably at a temperature of about 120° C., with from 0.2 to 8 molar equivalents of the monoolefinic hydrocarbon and from 0.0 to 8.0 molar equivalents of the third copolymerizable, monoolefinic compound. The time of heating is not critical, and the heating is of course continued until at least a useful quantity of the desired interpolymer is formed.

My interpolymerization reaction is promoted by the presence of free radicals, particularly those obtained by the thermal decomposition of peroxides, e. g., organic peroxides including acetyl peroxide, benzoyl peroxide, and tertiarybutyl hydrogenperoxide. Such promoters are usually employed in amounts of from 0.1 to 20.0%, mainly from 0.1 to 5.0%, by weight of the reactant mixture, and may be added either at the beginning, or incrementally throughout the reaction, the latter method often being preferable where reaction times exceed 36 hours.

The course of the reaction can be followed by measuring the increasing viscosity of the reaction mixture, and the product can be isolated by precipitation through addition of a non-solvent, e. g., n-hexane, or by removal of any unreacted starting materials by preferential extraction or distillation. Although it is unnecessary for most commercial applications, my interpolymers can be further purified, as for analytical purposes, by solution in a minimum volume of solvent and precipitation by dilution with an excess of n-hexane or methanol.

My new interpolymers can be employed in the solid form as molding powders for the preparation of various objects including rods, blocks and sheets. Alternatively, the soluble products can be dissolved in appropriate solvents for use as coating, impregnating and laminating compositions. For such purposes the crude interpolymerization reaction mixtures can themselves be employed by dilution with a suitable high-boiling solvent and subsequent removal of unreacted monomers by distillation. Suitable inert addends including dyes, pigments, plasticizers and fillers, as well as other resins, can be incorporated with my interpolymers by conventional dispersing techniques such as milling, mutual solution and/or agitation, in the presence of diluents.

The soluble, unsaturated resins of my invention are capable of undergoing further polymerization, especially when heated at 25–200° C. in the presence of peroxidic catalysts, to yield solvent- and heat-resistant moldings, coatings, castings, films, laminates, etc. For such purposes my soluble, convertible resin may be dissolved in liquid, copolymerizable ethylenic compounds, e. g., butyl acrylate, tolyl acrylate, allyl acrylate, vinyl butyrate, styrene, diethyl fumarate, and diallyl fumarate, to obtain solutions capable of being totally polymerized and leaving no solvent to be evaporated. Such solutions are particularly useful as initially fluid molding compositions capable of being cured with a minimum of shrinkage. They are likewise applicable to processes wherein evaporation of a residual inert solvent would constitute a technical hazard.

The following examples disclose my invention in more detail. All parts are by weight.

EXAMPLE 1

Polyolefinic esters are heated at 60° C. with various monoolefinic hydrocarbons until the point of incipient gelation is attained in each case or until no further increase in the viscosity of the reaction mixture is detectable. The reaction mixtures are then evaporated to remove any solvent which may be present and the residues are diluted with methanol. The precipitated polymers thus obtained are further purified by solution in a minimum volume of acetone and reprecipitation with methanol after which they are finally dried in vacuum to constant weight.

The reactions are summarized in Table I. To emphasize the advantages of my invention, polymerization by prior art methods, i. e., in the abscence of the olefinic hydrocarbons, is also included (I–a).

*Table I*

|  | "A" Polyolefinic Ester |  | "B" Olefinic Hydrocarbon |  | "C" Copolymerizable Monoolefinic Compound |  | Solvent |  | Benzoyl Peroxide | Reaction Time (Hrs.) | Soluble Polymeric Product |
|---|---|---|---|---|---|---|---|---|---|---|---|
| (a) | Diallyl Fumarate. | 100 | | | | | | | 1.0 | 4.25 | 9.0 |
| (b) | ......do...... | 100 | Cyclohexene.. | 233 | | | | | ¹2.0 | ²80.0 | 95.0 |
| (c) | ......do...... | 100 | | | | | Xylene.... | 233 | 1.0 | 34.0 | 13.0 |
| (d) | ......do...... | 100 | Diisobutylene. | 116.5 | | | ......do...... | 116.5 | ¹2.0 | 80.0 | 89.0 |
| (e) | ......do...... | 100 | Cyclohexene.. | 116.5 | | | ......do...... | 116.5 | ³2.0 | ²51.0 | 97.1 |
| (f) | ......do...... | 100 | 1-Pentene..... | 116.5 | | | ......do...... | 116.5 | ¹2.0 | ²80.0 | 57.0 |
| (g) | ......do...... | 100 | | | Styrene.... | 53.0 | | | 1.53 | 2.3 | 18.4 |
| (h) | ......do...... | 100 | Cyclohexene.. | 354 | ......do...... | 52.3 | | | ³3.04 | ²51.0 | 158.0 |
| (i) | Allyl Acrylate. | 100 | | | | | | | 1.0 | 1.5 | 16.6 |
| (j) | ......do...... | 100 | Diisobutylene. | 233 | | | | | 2.0 | 30.0 | 60.5 |
| (k) | Di-beta-allyl-oxyethyl fumarate. | 100 | | | | | {Xylene.... n-Butanol. | 100 50} | 1.0 | 11.0 | 31.0 |
| (l) | ......do...... | 100 | Diisobutylene. | 80 | | | {Xylene.... n-Butanol. | 50 30} | ¹1.4 | ²86.0 | 47.2 |

¹ Peroxide added in two equal increments at 0 and 40 hours of reaction time.
² No evidence of incipient gelation.
³ Peroxide added in two equal increments at 0 and 24 hours of reaction time.

EXAMPLE 2

A mixture of 294 parts of diallyl fumarate, 468 parts of styrene, 1138 parts of diisobutylene and 16.3 parts of benzoyl peroxide is heated under reflux conditions (about 120° C. at atmospheric pressure) for about 5 hours. During this time about 80% of the diallyl fumarate and styrene are converted to a soluble, fusible, ternary interpolymer with diisobutylene. The interpolymer can be isolated, if desired, by evaporation of the solvent, or by precipitation with a non-solvent, to obtain a white solid product which softens at about 104° C. This interpolymer is soluble in acetone and other organic solvents, is fusible, and contains residual allylic ester unsaturation. On completion of the reaction, a small amount of an inhibitor of polymerization, such as hydroquinone, may be added to stabilize the interploymer solution against further polymerization.

EXAMPLE 3

This illustrates the accelerated curing of surface coatings containing my novel allylic unsaturated interpolymers:

An enamel is formed of—100 parts of a 35% solution in xylene of an interpolymer prepared from a polymerizable mix of 235 parts of diallyl fumarate, 375 parts of styrene, and 840 parts of diisobutylene, with 280 parts of xylene as inert diluent during the interpolymerization; 0.33 part of manganese naphthenate (equivalent to 0.08% of manganese on the weight of the interpolymer) dissolved in 20 parts of toluene; 35 parts of titanium dioxide. The enamel is sprayed on a metal surface and baked in air at 400° F. for 20 minutes. The coating is flexible, resistant to solvents and alkalies, and shows good adhesion to the base, and is not discolored.

Having thus described my invention, what I claim and desire to protect by Letters Patent is:

1. In a method of polymerizing (A) a polyolefinic ester selected from the group consisting of poly-unsaturated esters, said unsaturation being ethylenic unsaturation, of alcohols of the formula R*CH=CR*—CH$_2$—X in which one R* is hydrogen and the other R* is a radical selected from the group consisting of hydrogen, chlorine, methyl, ethyl and phenyl and X is a radical selected from the group consisting of hydroxyl and hydroxyalkoxy radicals of the formula —O—CHR$^\phi$—CHR$^\phi$—OH wherein R$^\phi$ is a radical selected from the group consisting of hydrogen and alkyl, to form a soluble, unsaturated polymer by heating at 25 to 150° C. in the presence of a free radical type polymerization initiator, the step of carrying out the said polymerization in the presence of at least 0.2 mole of (B) a liquid copolymerizable monoolefinic hydrocarbon selected from the group consisting of cyclohexene and acyclic alkenes having from 5 to 10 carbon atoms, per mole of said ester, whereby the conversion of said ester to soluble, unsaturated polymer is substantially increased.

2. In a method of copolymerizing one mole of (A) a polyolefinic ester selected from the group consisting of poly-unsaturated esters, said unsaturation being ethylenic unsaturation, of alcohols of the formula R*CH=CR*—CH$_2$—X in which one R* is hydrogen and the other R* is a radical selected from the group consisting of hydrogen, chlorine, methyl, ethyl and phenyl and X is a radical selected from the group consisting of hydroxyl and hydroxyalkoxy radicals of the formula —O—CHR$^\phi$—CHR$^\phi$—OH wherein R$^\phi$ is a radical selected from the group consisting of hydrogen and alkyl, and 0.1 to 8 moles of (C) a copolymerizable monoolefinic compound, by heating at 25 to 150° C. in the presence of a free radical type polymerization initiator the step of carrying out the said copolymerization in the presence of at least 0.2 mole of (B) a liquid copolymerizable monoolefinic hydrocarbon selected from the group consisting of cyclohexene and acyclic alkenes having from 5 to 10 carbon atoms, whereby the conversion of said ester to soluble, unsaturated copolymer is substantially increased.

3. A soluble, unsaturated interpolymer of (A) diallyl fumarate, (B) diisobutylene, and (C) styrene, said interpolymer being formed by heating the said materials in proportion of from 0.2 to 8 moles of (B) and from 0.1 to 8 moles of (C) per mole of (A) in the presence of a free radical type polymerization initiator.

FRANK J. CARLIN.

REFERENCES CITED

The following references are of record in the file of this patent:

UNITED STATES PATENTS

| Number | Name | Date |
|---|---|---|
| 2,182,316 | Hopff | Dec. 5, 1939 |
| 2,276,094 | Rothrock | Mar. 10, 1942 |
| 2,391,162 | Huebner | Dec. 18, 1945 |
| 2,459,501 | Coon | Jan. 18, 1949 |